(12) United States Patent
Wu

(10) Patent No.: US 11,628,908 B2
(45) Date of Patent: Apr. 18, 2023

(54) BICYCLE DERAILLEUR, CHAIN GUIDE ASSEMBLY AND STRUCTURAL REINFORCEMENT SHEET THEREOF

(71) Applicant: TEKTRO TECHNOLOGY CORPORATION, Changhua County (TW)

(72) Inventor: Tzung Ye Wu, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 546 days.

(21) Appl. No.: 16/668,131

(22) Filed: Oct. 30, 2019

(65) Prior Publication Data
US 2020/0298935 A1    Sep. 24, 2020

(30) Foreign Application Priority Data
Mar. 20, 2019    (TW) ................................. 108109588

(51) Int. Cl.
| B62M 9/136 | (2010.01) |
| B62M 9/131 | (2010.01) |
| B62M 9/132 | (2010.01) |
| B62M 9/00  | (2006.01) |

(52) U.S. Cl.
CPC ............ *B62M 9/136* (2013.01); *B62M 9/131* (2013.01); *B62M 9/132* (2013.01); *B62M 2009/007* (2013.01)

(58) Field of Classification Search
CPC .... B62M 9/136; B62M 9/1342; B62M 9/126; B62M 9/131; F16H 2007/0872
USPC ...................................................... 474/80, 82
See application file for complete search history.

(56) References Cited

U.S. PATENT DOCUMENTS

| 4,078,444 A * | 3/1978 | Huret ..................... B62M 9/136 474/140 |
| 4,223,562 A * | 9/1980 | Nagano .................. B62M 9/136 474/82 |
| 4,551,121 A * | 11/1985 | Nagano .................. B62M 9/136 474/140 |
| 4,734,083 A * | 3/1988 | Nagano .................. B62M 9/135 474/140 |
| 5,312,301 A * | 5/1994 | Kobayashi ............. B62M 9/136 474/140 |
| 5,779,581 A * | 7/1998 | Fujii ...................... B62M 9/136 474/82 |

(Continued)

*Primary Examiner* — Henry Y Liu
(74) *Attorney, Agent, or Firm* — Locke Lord LLP; Tim Tingkang Xia, Esq.

(57) ABSTRACT

The disclosure provides a chain guide assembly configured to be mounted on a linkage assembly of a bicycle derailleur. The chain guide assembly includes an inner plate, an outer plate, a first connecting bridge and a second connecting bridge. The outer plate is spaced apart from the inner plate. Two opposite sides of the first connecting bridge are respectively connected to the inner plate and the outer plate. Two opposite sides of the second connecting bridge are respectively connected to the inner plate and the outer plate. The inner plate, the outer plate, the first connecting bridge, and the second connecting bridge are made of a single piece. In addition, the disclosure also provides a bicycle derailleur having the chain guide assembly and a structural reinforcement sheet of the chain guide assembly.

28 Claims, 13 Drawing Sheets

(56) References Cited

U.S. PATENT DOCUMENTS

| | | | | |
|---|---|---|---|---|
| 6,009,771 | A * | 1/2000 | Desenclos | B62M 9/136 474/82 |
| 6,013,000 | A * | 1/2000 | Moretz | F16H 7/08 474/140 |
| 6,454,671 | B1 * | 9/2002 | Wickliffe | F16H 7/22 474/82 |
| 6,641,494 | B1 * | 11/2003 | Campagnolo | B62M 9/136 474/81 |
| 6,641,495 | B2 * | 11/2003 | Valle | B62M 9/136 474/82 |
| 6,986,723 | B2 * | 1/2006 | Valle | B62M 9/136 474/82 |
| 7,025,698 | B2 * | 4/2006 | Wickliffe | B62M 9/136 474/82 |
| 7,081,058 | B2 * | 7/2006 | Nankou | B62M 9/1342 474/82 |
| 7,438,657 | B2 * | 10/2008 | Nakai | B62M 9/1342 474/80 |
| 7,806,792 | B2 * | 10/2010 | Fujii | B62M 9/136 474/82 |
| 7,951,028 | B2 * | 5/2011 | Wickliffe | B62M 9/136 474/80 |
| 7,963,871 | B2 * | 6/2011 | Peh | B62M 9/136 474/82 |
| 8,444,514 | B2 * | 5/2013 | Nankou | B62M 9/136 474/82 |
| 8,715,120 | B2 * | 5/2014 | Florczyk | B62M 9/136 474/82 |
| 9,061,730 | B2 * | 6/2015 | Inoue | B62M 9/136 |
| 9,796,450 | B2 * | 10/2017 | Emura | B62M 9/136 |
| 9,919,765 | B2 * | 3/2018 | Wickliffe | B62M 9/136 |
| 11,077,916 | B2 * | 8/2021 | Fujimoto | B62M 9/126 |
| 2002/0177498 | A1 * | 11/2002 | Wickliffe | B62M 9/137 474/82 |
| 2003/0228947 | A1 * | 12/2003 | Valle | B62M 9/136 474/82 |
| 2004/0214672 | A1 * | 10/2004 | Thomas | F16H 7/18 474/140 |
| 2005/0049095 | A1 * | 3/2005 | Shum | F16H 7/18 474/140 |
| 2005/0266946 | A1 * | 12/2005 | Thomas | F16H 7/18 474/111 |
| 2006/0019782 | A1 * | 1/2006 | Wickliffe | B62M 9/134 474/80 |
| 2007/0037647 | A1 * | 2/2007 | Markley | F16H 7/18 474/140 |
| 2007/0060427 | A1 * | 3/2007 | Nankou | B62M 9/136 474/80 |
| 2007/0123379 | A1 * | 5/2007 | Peh | B62M 9/136 474/80 |
| 2007/0135249 | A1 * | 6/2007 | Nanko | B62M 9/136 474/80 |
| 2007/0191158 | A1 * | 8/2007 | Ichida | B62M 9/136 474/70 |
| 2007/0197324 | A1 * | 8/2007 | Fujii | B62M 9/136 474/82 |
| 2008/0182689 | A1 * | 7/2008 | Fujii | B62M 9/136 474/82 |
| 2008/0305902 | A1 * | 12/2008 | Tetsu | B62M 9/1342 474/80 |
| 2009/0011879 | A1 * | 1/2009 | Sakamoto | F16H 7/18 474/111 |
| 2009/0111624 | A1 * | 4/2009 | Chiang | B62M 9/136 474/80 |
| 2009/0275430 | A1 * | 11/2009 | Markley | F16H 7/0848 474/111 |
| 2010/0022335 | A1 * | 1/2010 | Chiang | B62M 9/136 474/80 |
| 2010/0075788 | A1 * | 3/2010 | Wickliffe | B62M 9/1342 474/80 |
| 2012/0122620 | A1 * | 5/2012 | Lee | F16H 7/18 474/140 |
| 2012/0129636 | A1 * | 5/2012 | Lee | F16H 7/18 474/111 |
| 2012/0157250 | A1 * | 6/2012 | Jordan | B62M 9/134 29/428 |
| 2013/0085025 | A1 * | 4/2013 | Inoue | B62M 9/136 474/80 |
| 2013/0210566 | A1 * | 8/2013 | Konno | F16H 7/18 474/111 |
| 2014/0274507 | A1 * | 9/2014 | Wickliffe | B62M 9/136 474/80 |
| 2015/0260263 | A1 * | 9/2015 | Chottiner | C23C 28/322 427/527 |
| 2016/0068225 | A1 * | 3/2016 | Kuwayama | B62M 9/1342 474/80 |
| 2016/0116030 | A1 * | 4/2016 | Cowen | F16H 7/08 474/111 |
| 2016/0229488 | A1 * | 8/2016 | Kuwayama | B62M 9/1344 |
| 2017/0283005 | A1 * | 10/2017 | Inoue | F16H 55/30 |
| 2018/0222551 | A1 * | 8/2018 | Hara | B62M 9/1342 |
| 2019/0127023 | A1 * | 5/2019 | Fujimoto | B62M 9/126 |

\* cited by examiner

BICYCLE DERAILLEUR, CHAIN GUIDE ASSEMBLY AND STRUCTURAL REINFORCEMENT SHEET THEREOF

CROSS-REFERENCE TO RELATED APPLICATIONS

This non-provisional application claims priority under 35 U.S.C. § 119(a) on Patent Application No(s). 108109588 filed in Taiwan, R.O.C on Mar. 20, 2019, the entire contents of which are hereby incorporated by reference.

TECHNICAL FIELD

The disclosure relates to a bicycle derailleur and a chain guide assembly, more particularly to a chain guide assembly having an inner plate, an outer plate, and a first connecting bridge, which are made of non-metallic material, and a bicycle derailleur having the chain guide assembly. In addition, the disclosure also relates to a structural reinforcement sheet of the chain guide assembly.

BACKGROUND

In recent years, road bikes, mountain bikes and other types of bicycles are all popular in the market, and it motivates bicycle manufacturers to pay more attention on improving their products.

In order to reduce the weight of the bicycle, there is a bicycle that has a bicycle frame made of carbon fiber in the bicycle market, but the degree of weight reduction of the bicycle is still insufficient.

SUMMARY OF THE INVENTION

One embodiment of the disclosure provides a bicycle derailleur. The bicycle derailleur includes a fixing component, a linkage assembly and a chain guide assembly. The linkage assembly includes a first link and a second link. One end of the first link and One end of the second link are pivotably disposed on the fixing component. The other end of the second link away from the fixing component has two pivot parts. The chain guide assembly includes an inner plate and a first connecting bridge. The other end of the first link is pivotably disposed on the inner plate. The outer plate is spaced apart from the inner plate. Two opposite sides of the first connecting bridge are respectively connected to the inner plate and the outer plate. The inner plate, the outer plate and the first connecting bridge are made of non-metallic materials. The first connecting bridge has at least one pivot part. The two pivot parts of the second link are pivotably disposed on the pivot part of the first connecting bridge, and the pivot part of the first connecting bridge is located between the two pivot parts of the second link.

Another embodiment of the disclosure provides a chain guide assembly configured to be mounted on a linkage assembly of a bicycle derailleur. The chain guide assembly includes an inner plate, an outer plate, a first connecting bridge and a second connecting bridge. The outer plate is spaced apart from the inner plate. Two opposite sides of the first connecting bridge are respectively connected to the inner plate and the outer plate. Two opposite sides of the second connecting bridge are respectively connected to the inner plate and the outer plate. The inner plate, the outer plate, the first connecting bridge, and the second connecting bridge are made of a single piece.

Still Another embodiment of the disclosure provides a chain guide assembly configured to be mounted on a linkage assembly of a bicycle derailleur. The chain guide assembly includes an inner plate, an outer plate, a first connecting bridge and a first structural reinforcement sheet. The outer plate is spaced apart from the inner plate. Two opposite sides of the first connecting bridge are respectively connected to the inner plate and the outer plate. The first structural reinforcement sheet is disposed on the inner plate. Two of the inner plate, the outer plate, and the first connecting bridge are not made of a single piece. The inner plate, the outer plate, and the first connecting bridge are made of non-metallic materials, and the first structural reinforcement sheet is made of metal.

Yet another embodiment of the disclosure provides a structural reinforcement sheet configured to be disposed on a chain guide assembly. The structural reinforcement sheet includes a main body portion, a first corner portion and a second corner portion. The main body portion is located between and connected to the first corner portion and the second corner portion.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
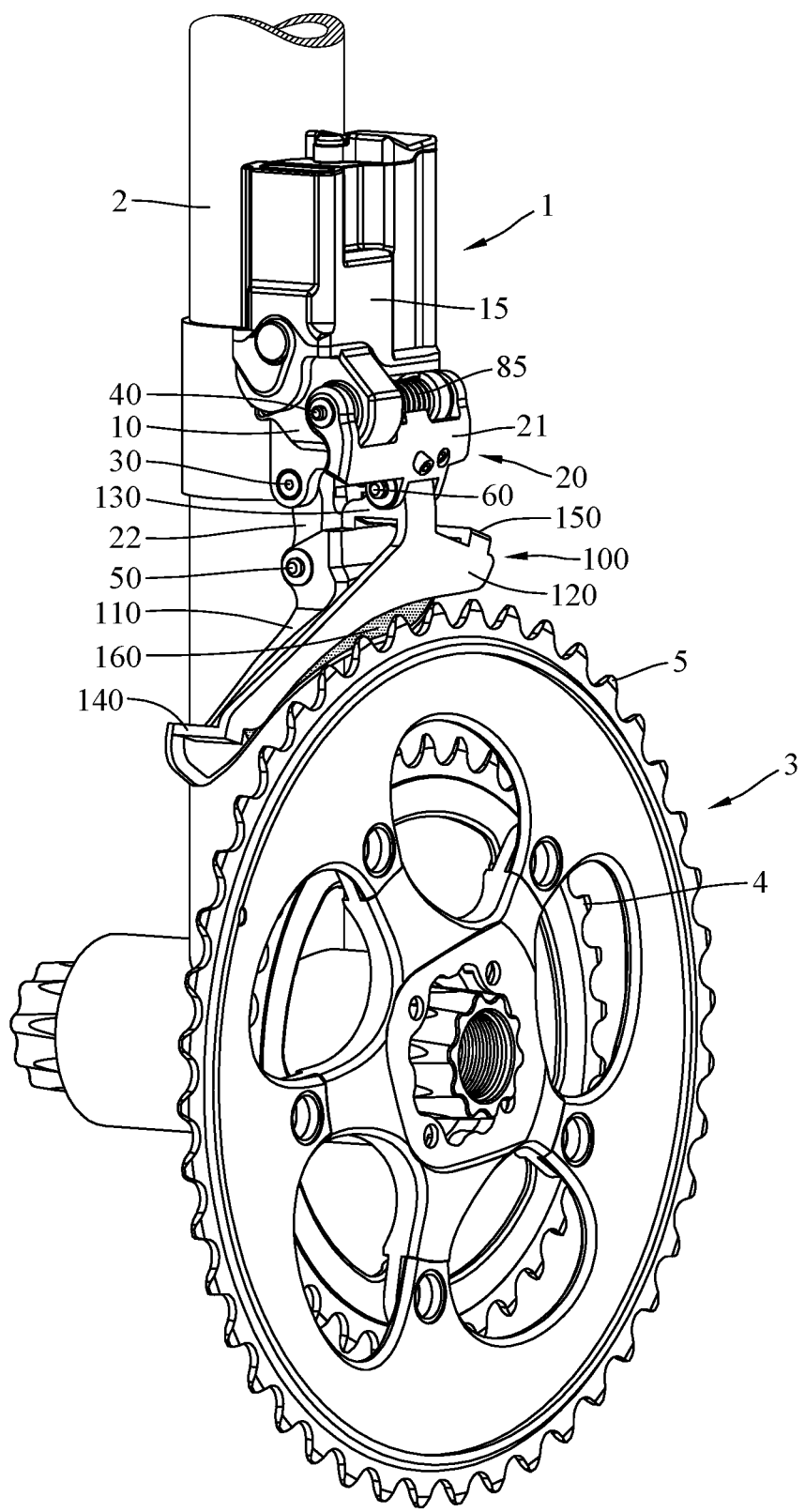
FIG. 1 is a perspective view of a bicycle derailleur, a bicycle frame, and a chainring set according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
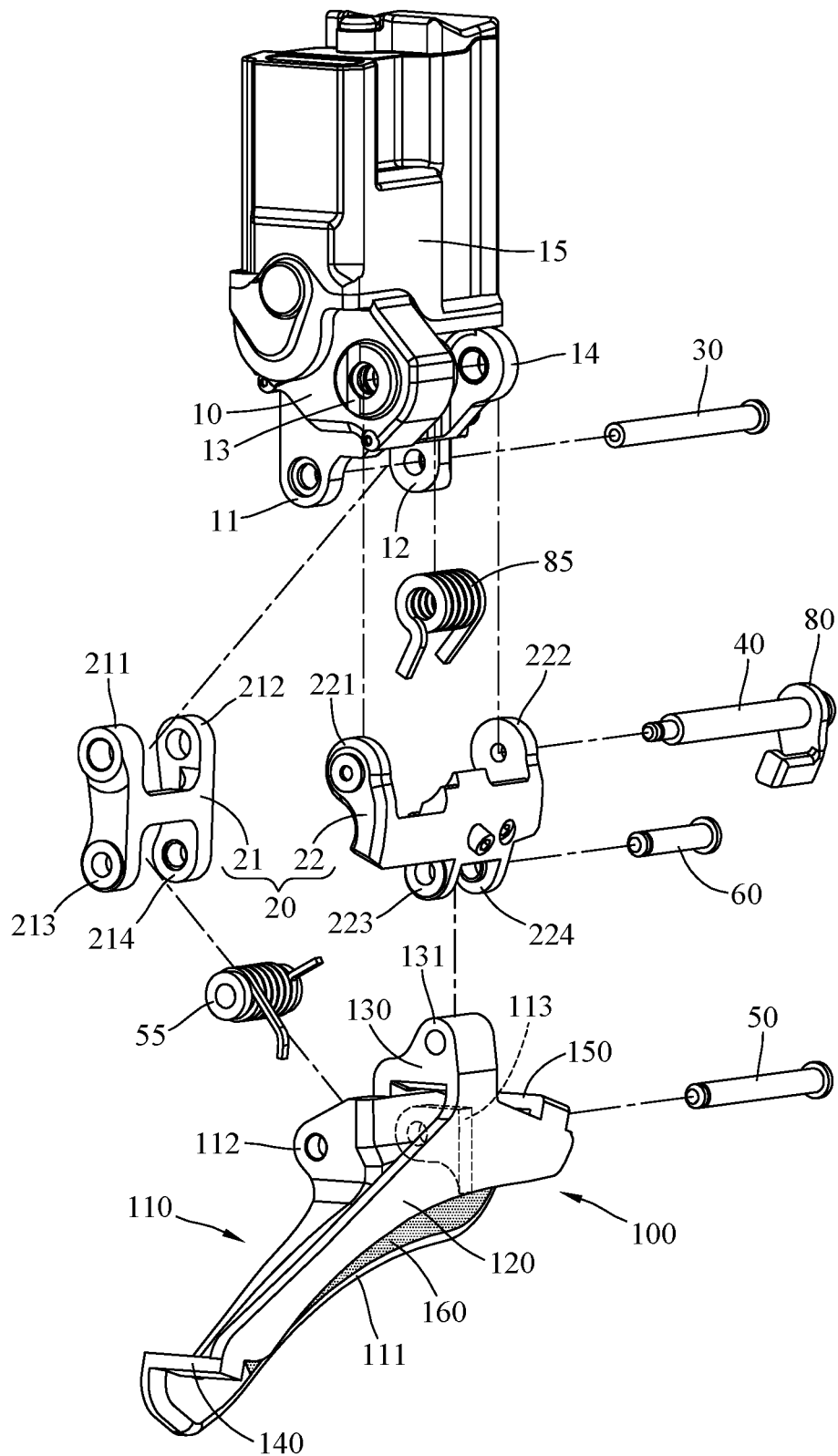
FIG. 2 is a partial exploded view of the bicycle derailleur in FIG. 1.
Figure 3:
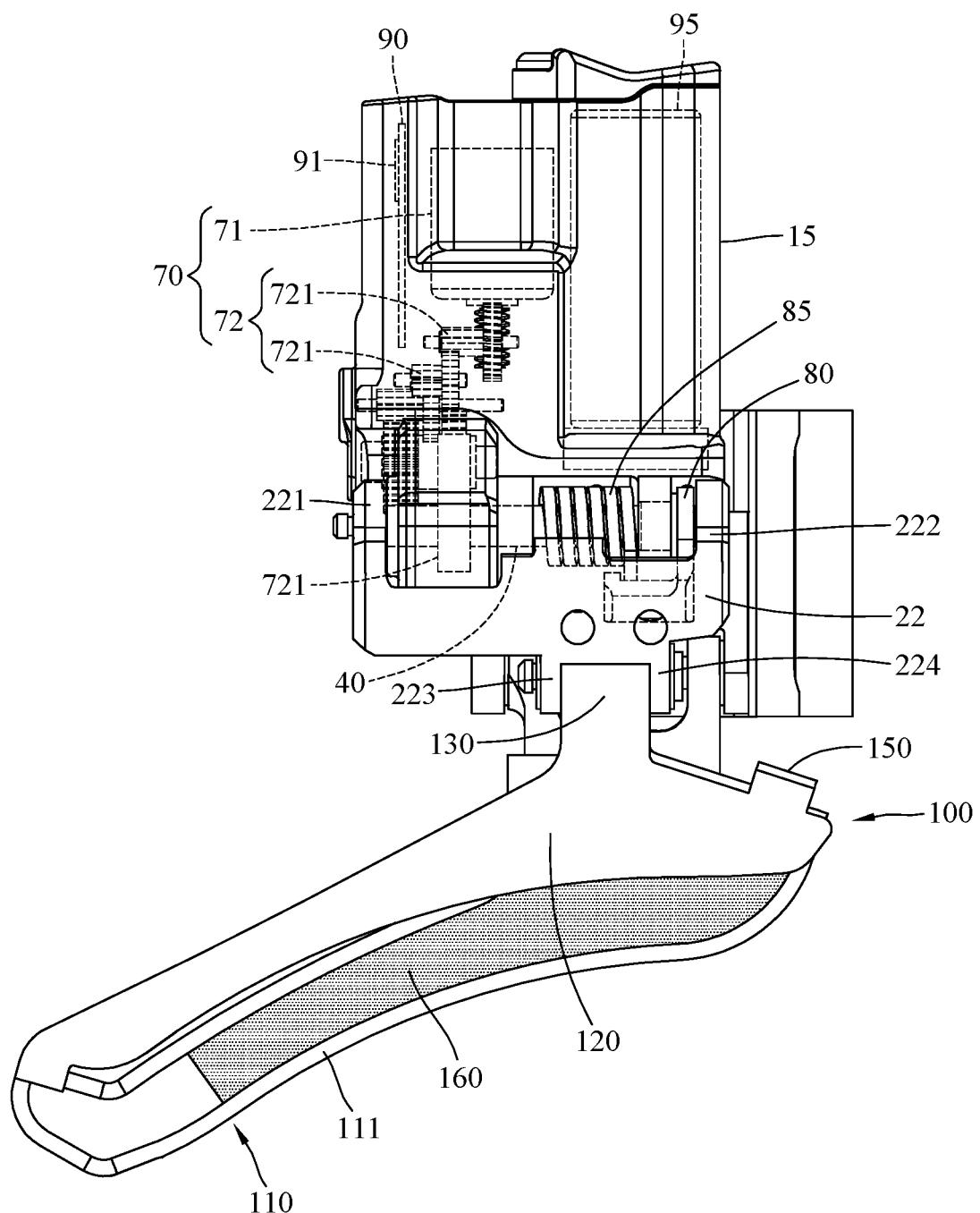
FIG. 3 is a lateral view of the bicycle derailleur in FIG. 1.

Referring to FIGS. 1 to 3, where FIG. 1 is a perspective view of a bicycle derailleur 1, a bicycle frame 2 and a chainring set 3 according to a first embodiment of the disclosure, FIG. 2 is a partial exploded view of the bicycle derailleur 1 in FIG. 1, and FIG. 3 is a lateral view of the bicycle derailleur 1 in FIG. 1.

In this embodiment, the bicycle derailleur 1 is, for example, a front derailleur. The bicycle derailleur 1 includes a fixing component 10, a linkage assembly 20, a first pivot 30, a second pivot 40, a chain guide assembly 100, a third pivot 50, a first elastic component 55, and a fourth pivot 60.

The fixing component 10 is configured to be mounted on the bicycle frame 2. The fixing component 10 has four pivot parts 11, 12, 13 and 14. The linkage assembly 20 includes a first link 21 and a second link 22. The first link 21 has four pivot parts 211, 212, 213 and 214. The pivot parts 211 and 212 of the first link 21 are respectively and pivotably disposed on the pivot parts 11 and 12 of the fixing component 10 via the first pivot 30, such that one end of the first link 21 is pivotably disposed on the fixing component 10. The second link 22 has four pivot parts 221, 222, 223 and 224. The pivot parts 221 and 222 of the second link 22 are respectively and pivotably disposed on the pivot parts 13 and 14 of the fixing component 10 via the second pivot 40, such that one end of the second link 22 is pivotably disposed on the fixing component 10.

Figure 4:
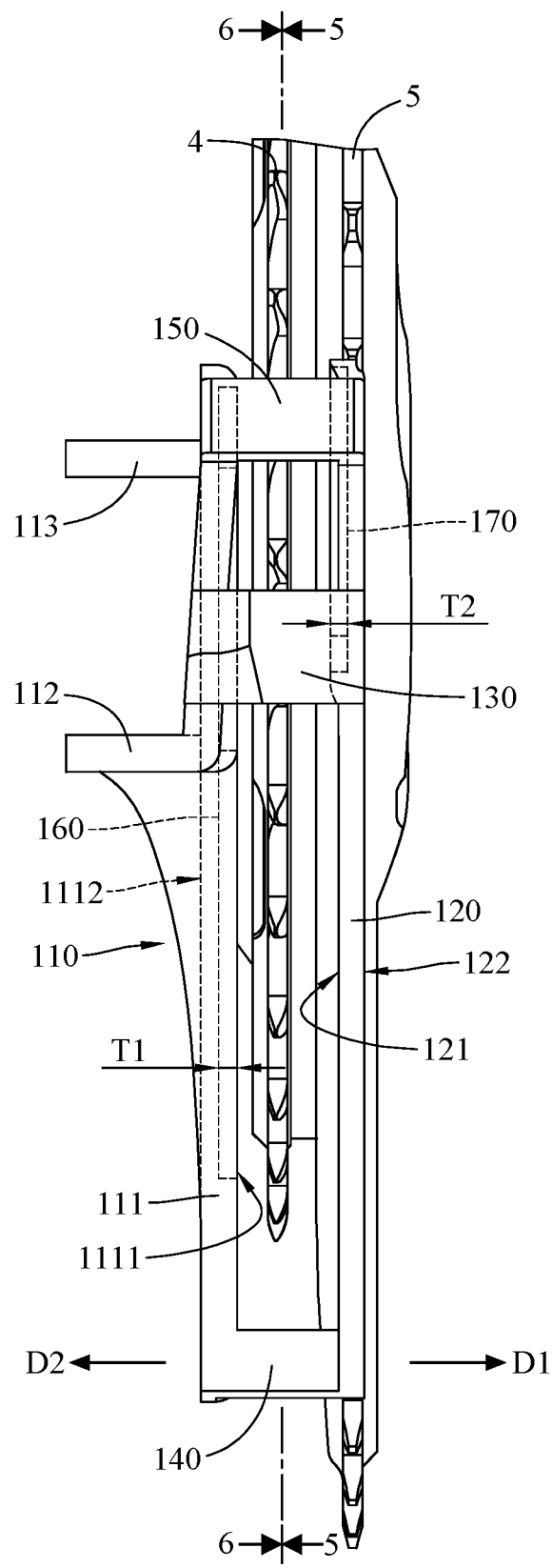
FIG. 4 is a top view of a chain guide assembly of the bicycle derailleur in FIG. 1.

Referring to FIGS. 1 to 4, where FIG. 4 is a top view of the chain guide assembly 100 of the bicycle derailleur 1 in FIG. 1.

The chain guide assembly 100 is configured to shift a bicycle chain (not shown) from one a chainring 4 to a chainring 5 of a chainring set 3, where the chainring 5 is larger than the chainring 4. The chain guide assembly 100 includes an inner plate 110, an outer plate 120, a first connecting bridge 130, a second connecting bridge 140, and a third connecting bridge 150.

The inner plate 110 includes a plate portion 111, a first pivot portion 112, and a second pivot portion 113. The plate portion 111 of the inner plate 110 is spaced apart from the outer plate 120. The plate portion 111 has an inner surface 1111 and an outer surface 1112, and the outer plate 120 has an inner surface 121 and an outer surface 122. The inner surface 1111 of the plate portion 111 faces the inner surface 121 of the outer plate 120. The outer surface 1112 of the plate portion 111 faces away from the inner surface 1111 of the plate portion 111. The outer surface 122 of the outer plate 120 faces away from the inner surface 121 of the outer plate 120. The first pivot portion 112 and the second pivot portion 113 are connected to the outer surface 1112 of the plate portion 111. Two opposite sides of the first connecting bridge 130 are respectively connected to the plate portion 111 of the inner plate 110 and the outer plate 120.

In this embodiment, the first pivot portion 112 and the second pivot portion 113 are respectively and pivotably disposed on the pivot parts 213 and 214 of the first link 21 via the third pivot 50. The first elastic component 55 is sleeved on the third pivot 50, and the first elastic component 55 is located between the pivot parts 213 and 214 of the first link 21. Two opposite ends of the first elastic component 55 are respectively in contact with the plate portion 111 of the inner plate 110 and the first link 21, and the first elastic component 55 is configured to force the chain guide assembly 100 to move toward the bicycle frame 2.

The first connecting bridge 130 has at least one pivot part 131. The pivot part 131 of the first connecting bridge 130 is pivotably disposed on the pivot parts 223 and 224 of the second link 22 via the fourth pivot 60, and the pivot part 131 of the first connecting bridge 130 is located between the pivot parts 223 and 224 of the second link 22. In this embodiment, there is only one pivot part 131 of the first connecting bridge 130 between the pivot parts 223 and 224 of the second link 22, and the single pivot part 131 substantially fills the gap between the pivot parts 223 and 224, such that the structural strength of the pivot part 131 of the first connecting bridge 130 is secured and thus making the pivot part 131 of the first connecting bridge 130 not easily broken.

Two opposite sides of the second connecting bridge 140 are respectively connected to one end of the plate portion 111 of the inner plate 110 and one end of the outer plate 120. Two opposite ends of the third connecting bridge 150 are respectively connected to the other end of the plate portion 111 of the inner plate 110 and the other end of the outer plate 120. The second connecting bridge 140 and the third connecting bridge 150 are respectively located at two opposite ends of the plate portion 111 of the inner plate 110, and the first connecting bridge 130 is located between the second connecting bridge 140 and the third connecting bridge 150. In addition, the first pivot portion 112 is located closer to the second connecting bridge 140 than the second pivot portion 113, and the second pivot portion 113 is located closer to the third connecting bridge 150 than the first pivot portion 112.

In this embodiment, the first connecting bridge 130, the second connecting bridge 140, the third connecting bridge 150, the inner plate 110, and the outer plate 120 are made of a single non-metallic piece. In detail, the first connecting bridge 130, the second connecting bridge 140, the third connecting bridge 150, the inner plate 110, and the outer plate 120 all include carbon fiber compound or glass fiber compound. The so-called carbon fiber compound contains carbon fiber and macromolecule (e.g., resin), and the so-called glass fiber compound contains glass fiber and macromolecule (e.g., resin).

Due to the material of the first connecting bridge 130, the second connecting bridge 140, the third connecting bridge 150, the inner plate 110, and the outer plate 120, the chain guide assembly 100 is more lightweight than the conventional metal chain guide assembly. Therefore, the chain guide assembly 100 helps to achieve the purpose of lightweight.

In this embodiment, the bicycle derailleur 1 further includes a casing 15, a driving assembly 70, a push component 80, a second elastic component 85, a circuit board 90, and a battery 95.

The casing 15 is disposed on a side of the fixing component 10 away from the chain guide assembly 100. The driving assembly 70 includes a motor 71 and a transmission set 72. The transmission set 72 includes a plurality of gears 721. The motor 71 and some of the gears 721 are disposed in the casing 15, and one of the gears 721 is located outside the casing 15 and fixed on the second pivot 40. The gears 721 are connected to one and another. The motor 71 is connected to one of the gears 721.

The push component 80 is fixed on the second pivot 40. The second elastic component 85 is sleeved on the second pivot 40, and two opposite ends of the second elastic component 85 are respectively in contact with the push component 80 and the second link 22. The second elastic component 85 can force the push component 80 to be in contact with the second link 22 when there is no external force applied to the push component 80.

The circuit board 90 and the battery 95 are disposed in the casing 15 and are respectively located at two opposite sides of the motor 71. There are terminals (not shown) disposed in the casing 15 and on the circuit board 90, and the terminals located in the casing 15 are electrically connected to the terminals located on the circuit board 90 via wires (not shown). As such, when the battery 95 is positioned in the casing 15, the battery 95 is electrically connected to the circuit board 90 via the terminals and wires. In addition, the circuit board 90 is electrically connected to the motor 71 via the terminals located on itself and another wires (not shown). The battery 95 is configured to provide electricity to the circuit board 90 and the motor 71.

The circuit board 90 has an antenna 91 configured to receive shift signals transmitted from a bicycle brake and shift lever. When the antenna 91 of the circuit board 90 receives a shift signal, the circuit board 90 activates the motor 71 to operate so as to pivot the push component 80 via the transmission set 72 and the second pivot 40, such that the first link 21 and the second link 22 can pivot the chain guide assembly 100.

As shown in FIGS. 1 and 4, a direction D1 is defined as a direction that the chain guide assembly 100 is moved away from the bicycle frame 2, and a direction D2 is opposite to the direction D1; that is, the direction D2 is a direction that the chain guide assembly 100 is moved toward the bicycle frame 2. When the bicycle chain is located at the chainring 4, and the antenna 91 receives an upshift signal, the chain guide assembly 100 is pivoted along the direction D1 by the first link 21 and the second link 22, such that the bicycle chain is shifted to the chainring 5 by the inner plate 110. On the other hand, when the bicycle chain is located at the chainring 5, and the antenna 91 receives a downshift signal, the chain guide assembly 100 is pivoted along the direction D2 by the first link 21 and the second link 22, such that the bicycle chain is moved to the chainring 4 by the outer plate 120.

Figure 5:
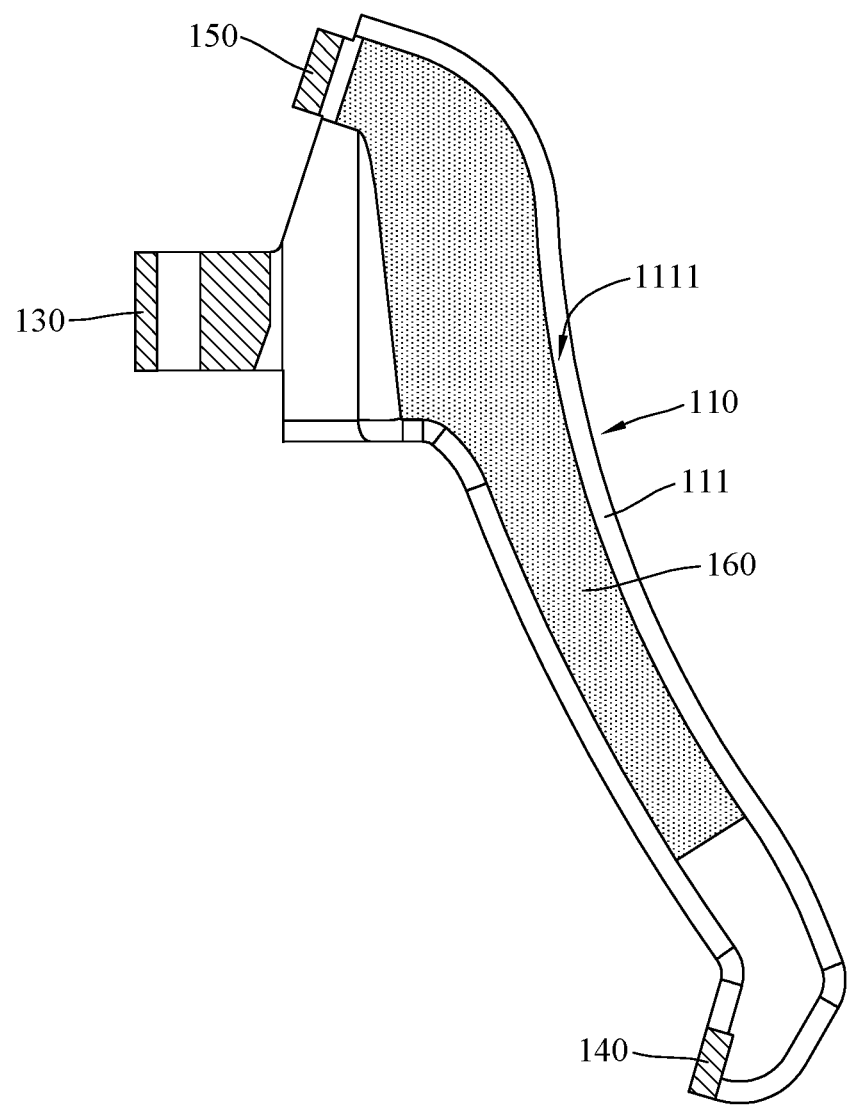
FIG. 5 is a cross-sectional view of the chain guide assembly taken along line 5-5 in FIG. 4.
Figure 6:
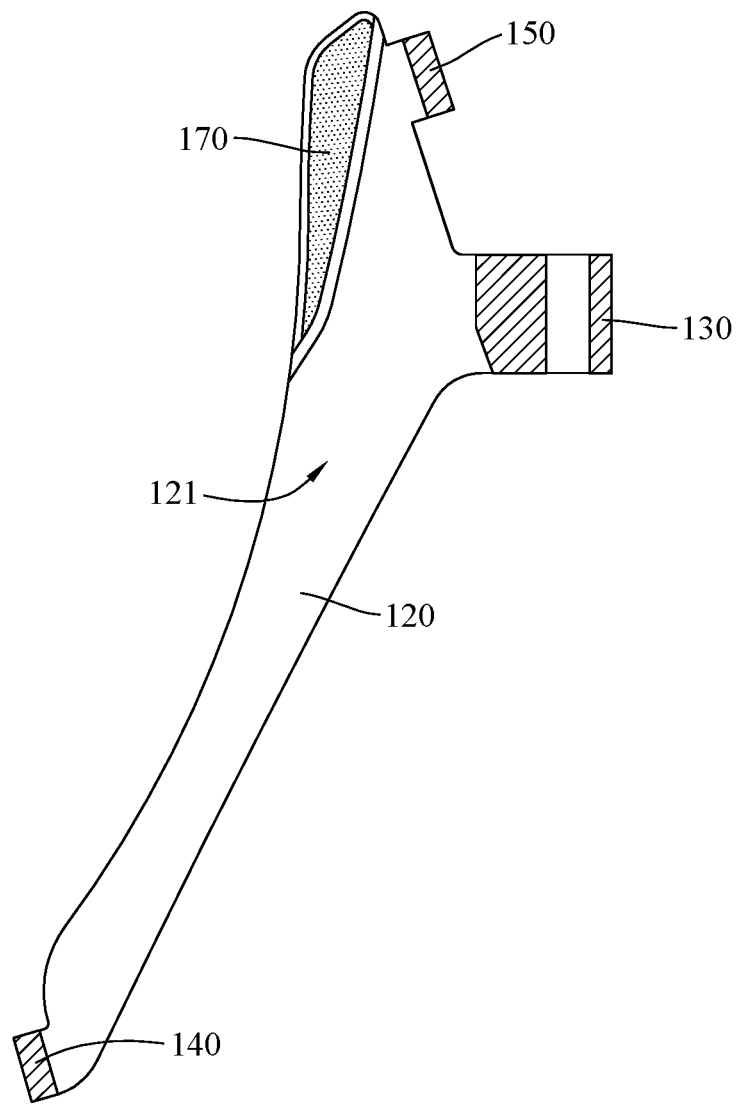
FIG. 6 is a cross-sectional view of the chain guide assembly taken along line 6-6 in FIG. 4.

Then, referring to FIGS. 4 to 6, where FIG. 5 is a cross-sectional view of the chain guide assembly 100 taken along line 5-5 in FIG. 4, and FIG. 6 is a cross-sectional view of the chain guide assembly 100 taken along line 6-6 in FIG. 4.

The chain guide assembly 100 further includes a first structural reinforcement sheet 160 and a second structural reinforcement sheet 170. The first structural reinforcement sheet 160 and the second structural reinforcement sheet 170 are made of metal, such as stainless iron or titanium. The first structural reinforcement sheet 160 has a larger area than the second structural reinforcement sheet 170, and a thickness T1 of the first structural reinforcement sheet 160 and a thickness T2 of the second structural reinforcement sheet 170 both approximately range between 0.1 millimeters and 3 millimeters. The first structural reinforcement sheet 160 is disposed on a side of the plate portion 111 of the inner plate 110 facing the outer plate 120, and the second structural reinforcement sheet 170 is disposed on a side of the outer plate 120 facing the plate portion 111 of the inner plate 110. In detail, the first structural reinforcement sheet 160 and the second structural reinforcement sheet 170 are respectively embedded to the plate portion 111 of the inner plate 110 and the outer plate 120, the first structural reinforcement sheet 160 is located at the inner surface 1111 of the plate portion 111, and the second structural reinforcement sheet 170 is located at the inner surface 121 of the outer plate 120.

In more detail, the first structural reinforcement sheet 160 and the second structural reinforcement sheet 170 are placed in the mold for the inner plate 110, the outer plate 120, the first connecting bridge 130, the second connecting bridge 140, and the third connecting bridge 150 prior to forming the inner plate 110, the outer plate 120, the first connecting bridge 130, the second connecting bridge 140, and the third connecting bridge 150. As such, after the inner plate 110, the outer plate 120, the first connecting bridge 130, the second connecting bridge 140 and the third connecting bridge 150 are formed, the first structural reinforcement sheet 160 and the second structural reinforcement sheet 170 are respectively embedded in the plate portion 111 of the inner plate 110 and the outer plate 120. However, note that how to position the first structural reinforcement sheet 160 and the second structural reinforcement sheet 170 are not particularly restricted.

For example, in another embodiment, the inner plate 110 and the outer plate 120 may be formed with several recesses prior to the placement of the first structural reinforcement sheet 160 and the second structural reinforcement sheet 170, and then the first structural reinforcement sheet 160 and the second structural reinforcement sheet 170 can be placed in these recesses and fixed in position by adhesive.

In this embodiment, during the shifting of the bicycle chain by the chain guide assembly 100, the bicycle chain contacts the first structural reinforcement sheet 160 or the second structural reinforcement sheet 170 instead of contacting the plate portion 111 of the inner plate 110 or the outer plate 120, which avoids the bicycle chain from abrading the plate portion 111 of the inner plate 110 and the outer plate 120, thereby increasing the durability of the chain guide assembly 100.

In contrast, to a chain guide assembly that does not have any structural reinforcement sheet, the contact area of the inner plate caused as moving the bicycle chain from the chainring 4 to the chainring 5 is larger than the contact area of the outer plate caused as moving the bicycle chain from the chainring 5 to the chainring 4. Therefore, in the embodiment, the first structural reinforcement sheet 160 having larger area can prevent the plate portion 111 of the inner plate 110 from having large abraded area, thereby further increasing the durability of the chain guide assembly 100.

In addition, the first structural reinforcement sheet 160 having larger area increases the structural strength of the inner plate 110 to resist the resistance force (e.g., the tension force of the bicycle chain) produced during the shifting of the bicycle chain from the chainring 4 to the chainring 5. Also, the second structural reinforcement sheet 170 also can increase the structural strength of the outer plate 120.

Figure 7:
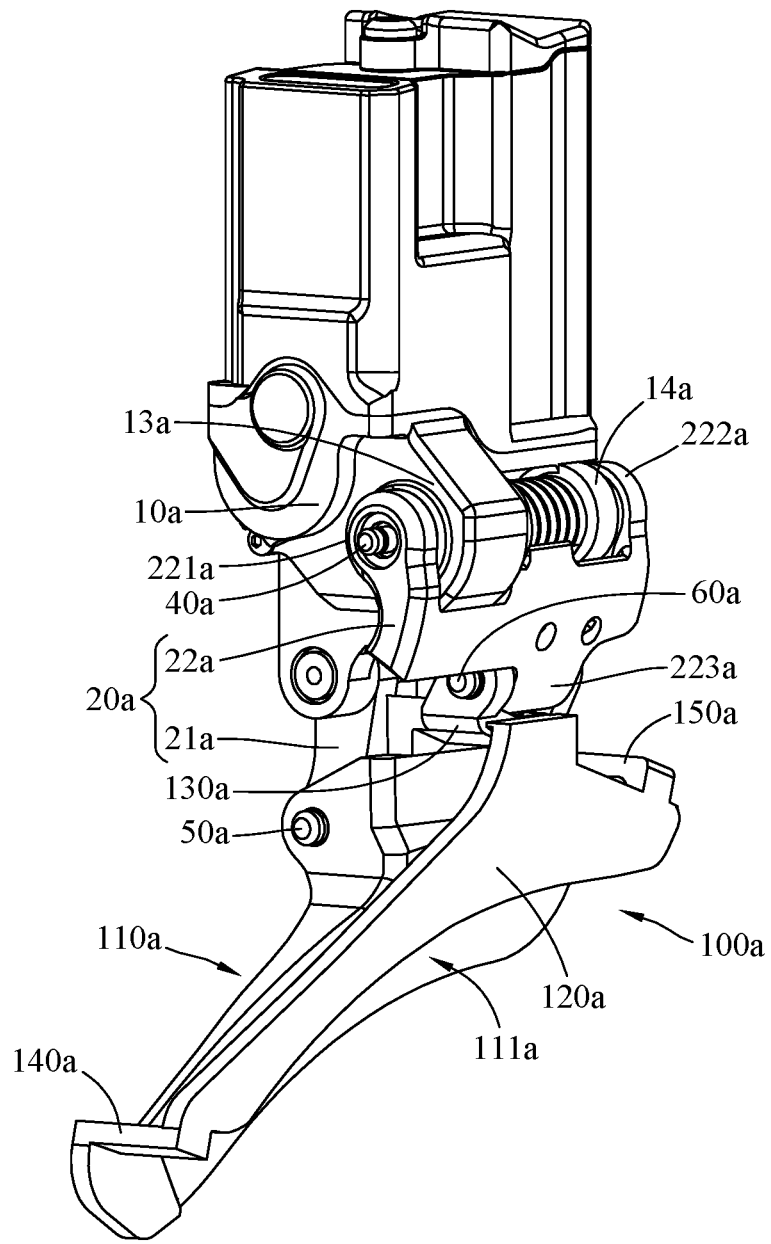
FIG. 7 is a perspective view of a bicycle derailleur according to a second embodiment of the disclosure.
Figure 8:
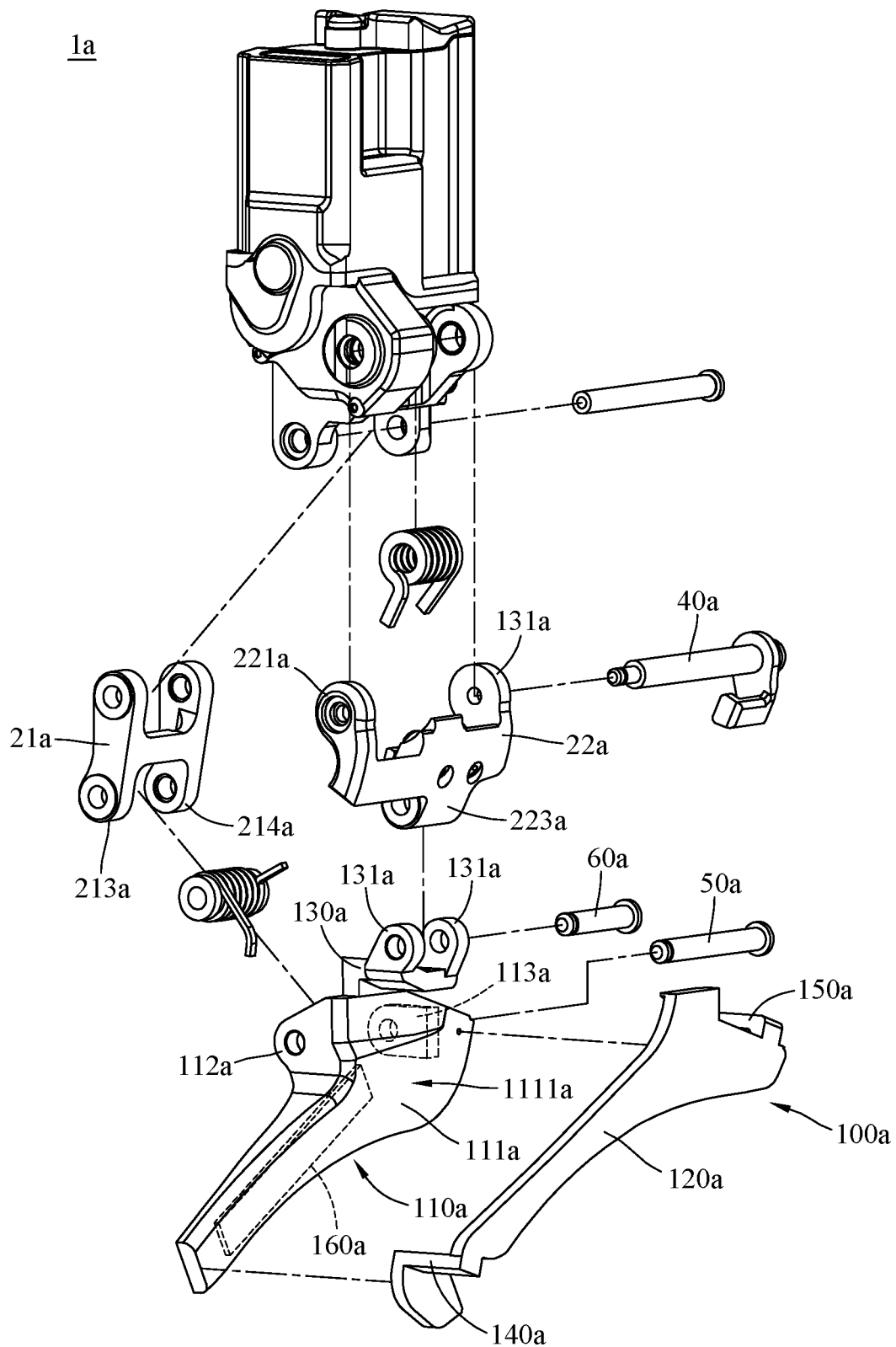
FIG. 8 is a partial exploded view of the bicycle derailleur in FIG. 7.
Figure 9:
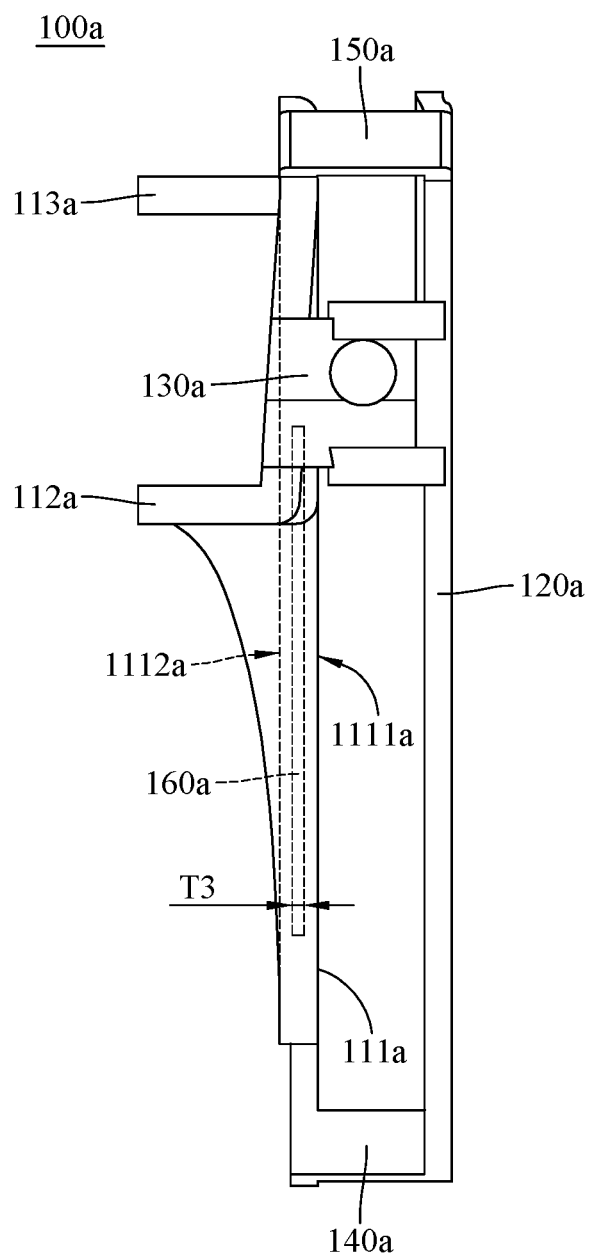
FIG. 9 is a top view of a chain guide assembly of the bicycle derailleur in FIG. 7.

Note that, in the disclosure, the first connecting bridge, the second connecting bridge, the third connecting bridge, the inner plate, and the outer plate may not be made of a single piece; for example, referring to FIGS. 7 to 9, where FIG. 7 is a perspective view of a bicycle derailleur 1a according to a second embodiment of the disclosure, FIG. 8 is a partial exploded view of the bicycle derailleur 1a in FIG. 7, and FIG. 9 is a top view of a chain guide assembly 100a of the bicycle derailleur 1a in FIG. 7.

In this embodiment, the bicycle derailleur 1a and the bicycle derailleur 1 in the previous embodiments are generally similar but yet are different in some aspects, thus the following paragraphs merely illustrate the difference therebetween for the purpose of simple illustration.

In this embodiment, a second link 22a of a linkage assembly 20a merely have three pivot parts 221a, 222a and 223a. The pivot parts 221a and 222a of the second link 22a are respectively and pivotably disposed on pivot parts 13a and 14a of a fixing component 10a via a pivot 40a of the bicycle derailleur 1a, such that one end of the second link 22a is pivotably disposed on the fixing component 10a.

The chain guide assembly 100a includes an inner plate 110a, an outer plate 120a, a first connecting bridge 130a, a second connecting bridge 140a and a third connecting bridge 150a.

The inner plate 110a includes a plate portion 111a, a first pivot portion 112a and a second pivot portion 113a. The plate portion 111a of the inner plate 110a is spaced apart from the outer plate 120a. The plate portion 111a has an inner surface 1111a and an outer surface 1112a. The inner surface 1111a of the plate portion 111a faces the outer plate 120a, and the outer surface 1112a of the plate portion 111a faces away from the inner surface 1111a of the plate portion 111a. The first pivot portion 112a and the second pivot portion 113a are connected to the outer surface 1112a of the plate portion 111a. Two opposite sides of the first connecting bridge 130a are respectively connected to the plate portion 111a of the inner plate 110a and the outer plate 120a.

In this embodiment, the first pivot portion 112a and the second pivot portion 113a are pivotably disposed on pivot parts 213a and 214a of a first link 21a of the linkage assembly 20a via a pivot 50a of the bicycle derailleur 1a. The first connecting bridge 130a has two pivot parts 131a. The pivot parts 131a are pivotably disposed on the pivot part 223a of the second link 22a via a pivot 60a of the bicycle derailleur 1a, and there is only one pivot part 223a of the second link 22a located between the pivot parts 131a.

Two opposite sides of the second connecting bridge 140a are respectively connected to one end of the plate portion 111a of the inner plate 110a and one end of the outer plate 120a, and two opposite sides of the third connecting bridge 150a are respectively connected to the other end of the plate portion 111a of the inner plate 110a and the other end of the outer plate 120a. The second connecting bridge 140a and the third connecting bridge 150a are respectively located at two opposite ends of the plate portion 111a of the inner plate 110a, and the first connecting bridge 130a is located between the second connecting bridge 140a and the third connecting bridge 150a. In addition, the first pivot portion 112a is located closer to the second connecting bridge 140a than the second pivot portion 113a, and the second pivot portion 113a is located closer to the third connecting bridge 150a than the first pivot portion 112a.

In this embodiment, the first connecting bridge 130a, the second connecting bridge 140a, the third connecting bridge 150a, the inner plate 110a and the outer plate 120a of the chain guide assembly 100a are made of non-metallic materials. In detail, the first connecting bridge 130a, the second connecting bridge 140a, the third connecting bridge 150a, the inner plate 110a and the outer plate 120a all includes carbon fiber compound or glass fiber compound. The so-called carbon fiber compound contains carbon fiber and macromolecule (e.g., resin), and the so-called glass fiber compound contains glass fiber and macromolecule (e.g., resin).

In addition, the chain guide assembly 100a is not made of a single piece. In specific, in this embodiment, the first connecting bridge 130a and the inner plate 110a are made of a single piece, and the second connecting bridge 140a, the third connecting bridge 150a, and the outer plate 120a are made of another single piece. The second connecting bridge 140a, the third connecting bridge 150a, and the outer plate 120a are respectively mounted on the two opposite ends of the inner plate 110a and the first connecting bridge 130a, for example, via adhesive, screws or rivets.

Also, in the case that the inner plate, the outer plate, the first connecting bridge, the second connecting bridge, and the third connecting bridge all contain carbon fiber compound or glass fiber compound, the single piece of the first connecting bridge and the inner plate and the other single piece of the second connecting bridge, the third connecting bridge, and the outer plate 120a can be formed separately, and then these two pieces can be put into the same mold to be formed into a single unit by heat welding.

Due to the material of the first connecting bridge 130a, the second connecting bridge 140a, the third connecting bridge 150a, the inner plate 110a and the outer plate 120a, the chain guide assembly 100a is more lightweight than the conventional metal chain guide assembly. Therefore, the chain guide assembly 100a helps to achieve the purpose of lightweight.

In this embodiment, the chain guide assembly 100a further includes a first structural reinforcement sheet 160a. The first structural reinforcement sheet 160a is made of metal, such as stainless iron or titanium. A thickness T3 of the first structural reinforcement sheet 160a approximately ranges between 0.1 millimeters and 3 millimeters. The first structural reinforcement sheet 160a is embedded in the plate portion 111a of the inner plate 110a, and the first structural reinforcement sheet 160a are distanced from the inner surface 1111a and the outer surface 1112a of the plate portion 111a. The manner that the first structural reinforcement sheet 160a is embedded in the plate portion 111a of the inner plate 110a is similar to that of the first structural reinforcement sheet 160 of the previous embodiment, thus the following paragraphs will not further discuss.

In this embodiment, the first structural reinforcement sheet 160a embedded in the plate portion 111a of the inner plate 110a can increase the structural strength of the inner plate 110a.

Figure 12:
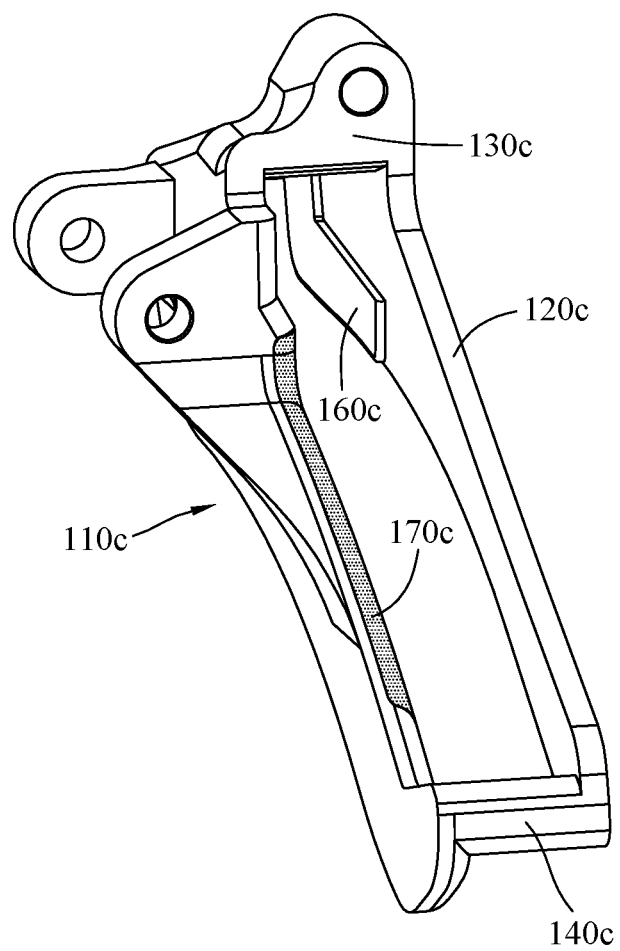
FIG. 12 is another perspective view of the chain guide assembly in FIG. 11.

Moreover, in this embodiment or another embodiment, the chain guide assembly 100a may further include a structural reinforcement protrusion, such as the structural reinforcement protrusion 160c shown in FIG. 12. The structural reinforcement protrusion may be disposed at a surface of the outer plate 120a facing the inner plate 110a, and the structural reinforcement protrusion and the outer plate 120a may be made of a single piece and made of the same material. The structural reinforcement protrusion can increase the structural strength of the outer plate 120a for guiding the bicycle chain.

Figure 10:
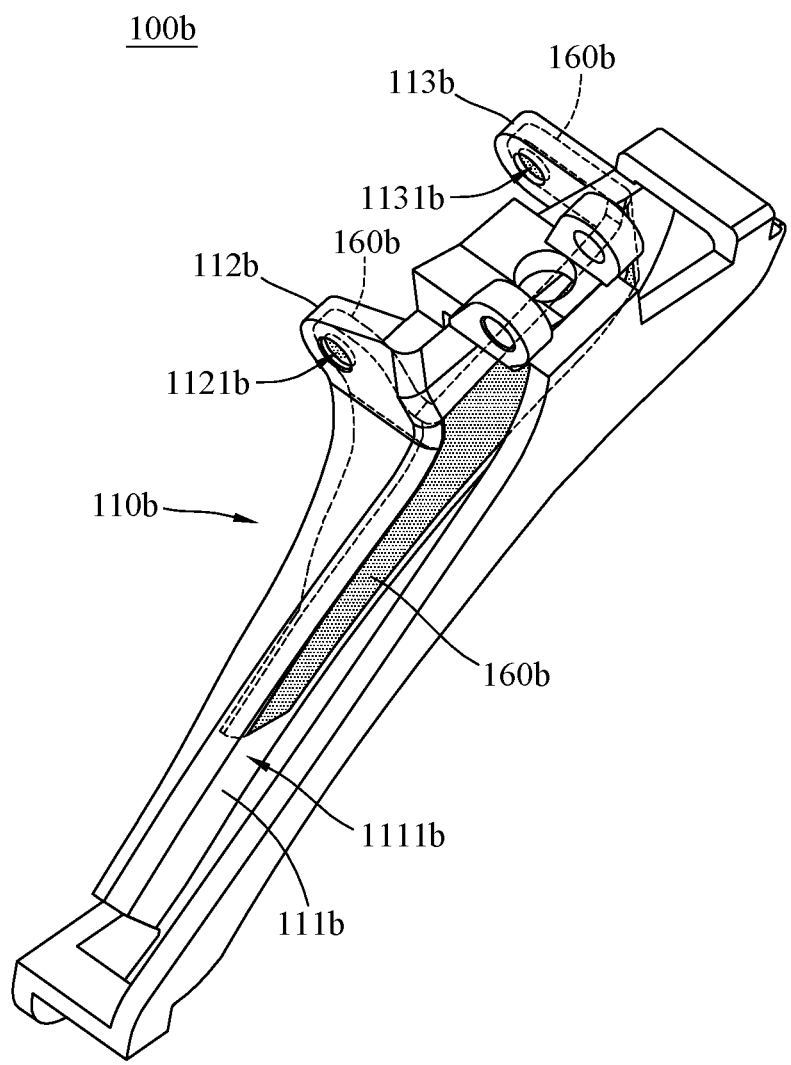
FIG. 10 is a perspective view of a chain guide assembly according to a third embodiment of the disclosure.

Then, referring to FIG. 10, where FIG. 10 is a perspective view of a chain guide assembly 100b according to a third embodiment of the disclosure.

In this embodiment, the chain guide assembly 100b and the chain guide assembly 100a in the previous embodiment are generally similar but are different in some aspects, thus the following paragraphs merely illustrate the difference therebetween for the purpose of simple illustration.

In this embodiment, a first pivot portion 112b of an inner plate 110b of the chain guide assembly 100b has a pivot hole 1121b, and the second pivot portion 113b of the inner plate 110b has a pivot hole 1131b. The pivot holes 1121b and 1131b is configured to be penetrated by pivot 50a shown in FIG. 8, such that the first pivot portion 112b and the second pivot portion 113b is pivotably disposed on the first link 21a of the linkage assembly 20a. A first structural reinforcement sheet 160b of the chain guide assembly 100b is embedded in the inner plate 110b. The first structural reinforcement sheet 160b is partially located in the plate portion 111b of the inner plate 110b and exposed from an inner surface 1111b of the plate portion 111b, and another parts of the first structural reinforcement sheet 160b extend to the first pivot portion 112b and the second pivot portion 113b, and the pivot holes 1121b and 1131b penetrate through the first structural reinforcement sheet 160b; that is, the first structural reinforcement sheet 160b is arranged in the plate portion 111b, the first pivot portion 112b and the second pivot portion 113b of the inner plate 110b and surrounds the pivot holes 1121b and 1131b, thereby increasing the structural strength of the inner plate 110b.

In this embodiment, during the shifting of the bicycle chain by the chain guide assembly 100b, the bicycle chain contacts the first structural reinforcement sheet 160b instead of contacting the plate portion 111b of the inner plate 110b, which avoids the bicycle chain from abrading the plate portion 111b of the inner plate 110b, thereby increasing the durability of the chain guide assembly 100b.

Figure 11:
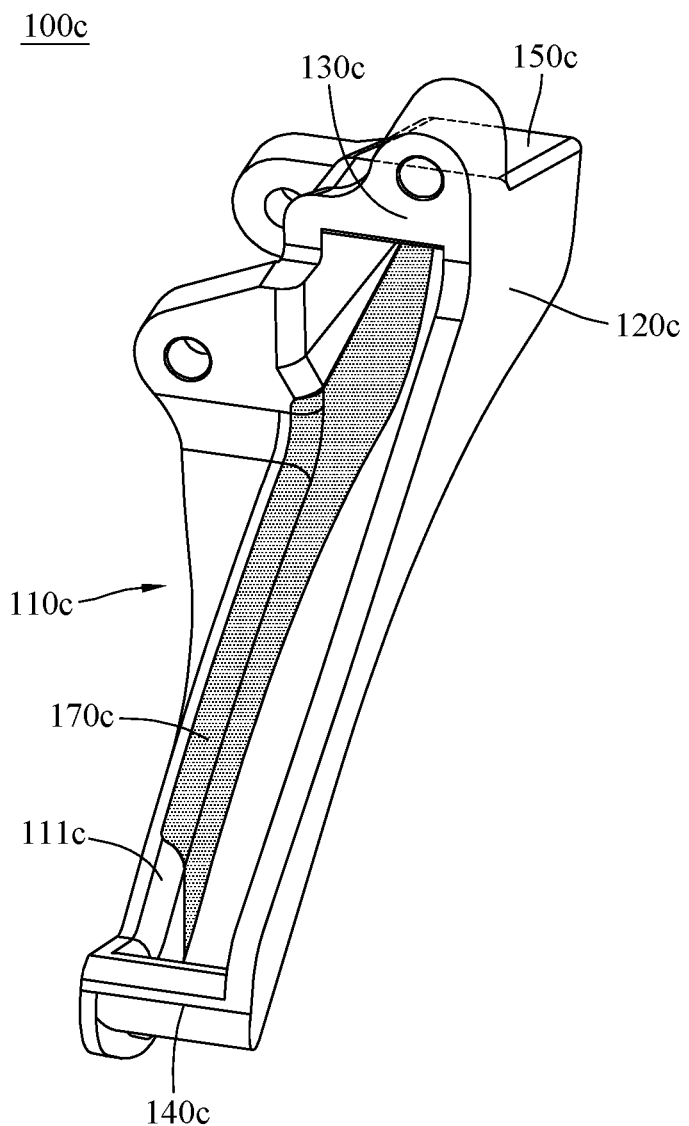
FIG. 11 is a perspective view of a chain guide assembly according to a fourth embodiment of the disclosure.
Figure 13:
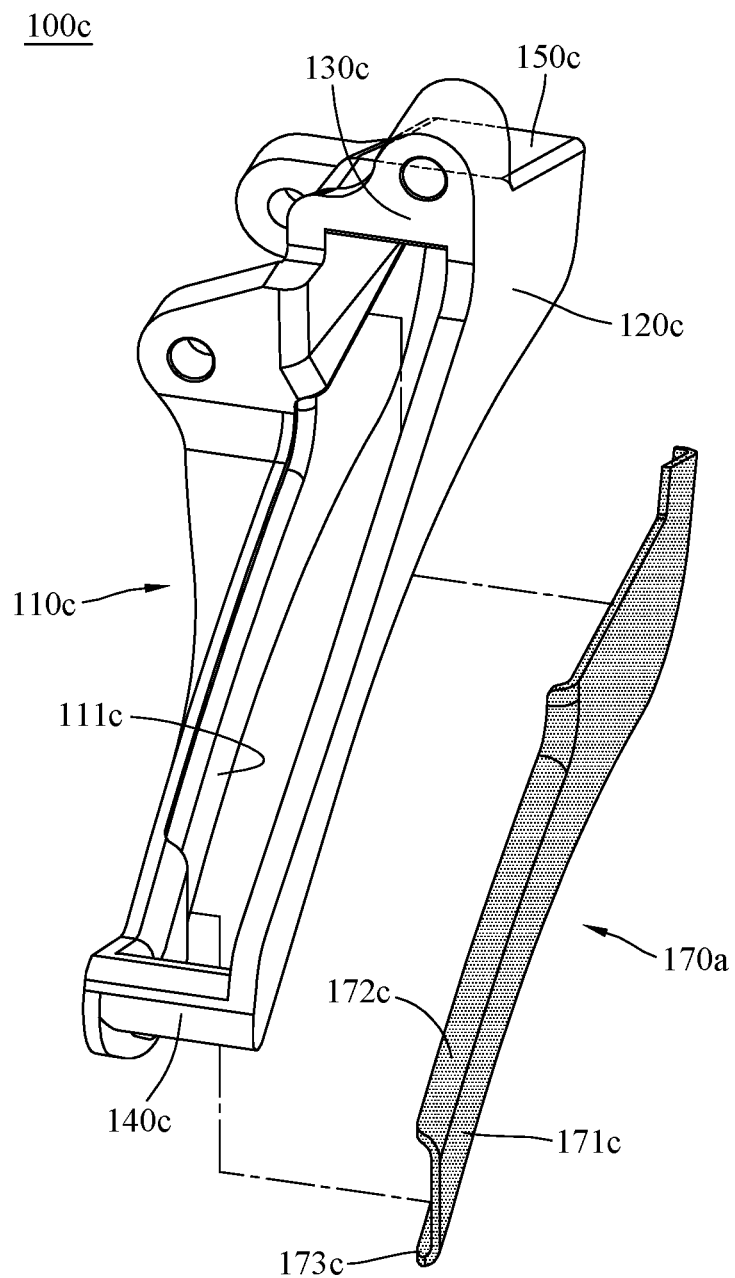
FIG. 13 is an exploded view of the chain guide assembly in FIG. 11.

Then, referring FIGS. 11 to 13, where FIG. 11 is a perspective view of a chain guide assembly 100c according to a fourth embodiment of the disclosure, FIG. 12 is another perspective view of the chain guide assembly 100c in FIG. 11, and FIG. 13 is an exploded view of the chain guide assembly 100c in FIG. 11.

In this embodiment, the chain guide assembly 100c and the chain guide assembly 100 are in the previous embodiment are generally similar but yet are different in some aspects, thus the following merely illustrate the difference therebetween for the purpose of simple illustration.

In this embodiment, a third connecting bridge 150c of the chain guide assembly 100c is not only connected to a plate portion 111c of an inner plate 110c of the chain guide assembly 100c and an outer plate 120c of the chain guide assembly 100c, but also connected to a first connecting bridge 130c of the chain guide assembly 100c, and this arrangement can increase the structural strength of the inner plate 110c, the outer plate 120c, the first connecting bridge 130c, the second connecting bridge 140c and the third connecting bridge 150c which are made of a single piece.

Furthermore, the chain guide assembly 100c further includes a structural reinforcement protrusion 160c. The structural reinforcement protrusion 160c is disposed on a surface of the outer plate 120c facing the inner plate 110c, and the structural reinforcement protrusion 160c and the outer plate 120c are made of a single piece and made of the same material; that is, the inner plate 110c, the outer plate 120c, the first connecting bridge 130c, the second connecting bridge 140c, the third connecting bridge 150c and the structural reinforcement protrusion 160c are made of a single piece and thus further increasing the structural strength of the chain guide assembly 100c.

In addition, the chain guide assembly 100c includes only one structural reinforcement sheet, that is, a first structural reinforcement sheet 170c. The first structural reinforcement sheet 170c is disposed on the plate portion 111c of the inner plate 110c. The first structural reinforcement sheet 170c includes a main body portion 171c, a first corner portion 172c, and a second corner portion 173c. and the main body portion 171c are located between and connected to the first corner portion 172c and the second corner portion 173c. The first corner portion 172c and the second corner portion 173c are fillets with a curvature not less than 0.1 millimeters.

In this embodiment, the chain guide assembly 100c is not restricted to include the first structural reinforcement sheet 170c; in some other embodiments, the chain guide assembly may not include first structural reinforcement sheet but another structural reinforcement protrusion. In specific, the chain guide assembly may include a first structural reinforcement protrusion and a second structural reinforcement protrusion. The first structural reinforcement protrusion may be disposed on a surface of the inner plate facing to the outer plate, and the first structural reinforcement protrusion and the inner plate may be made of a single piece and have the same material. The second structural reinforcement protrusion may be disposed on the surface of the outer plate facing to the inner plate, and the second structural reinforcement protrusion and the outer plate may be made of a single piece and have the same material. As such, the first structural reinforcement protrusion and the second structural reinforcement protrusion can increase the structural strength of the chain guide assembly for guiding the bicycle chain.

According to the bicycle derailleurs as discussed above, due to the material of the first connecting bridge, the second connecting bridge, the third connecting bridge, the inner plate, and the outer plate, the chain guide assembly is more lightweight than the conventional metal chain guide assembly. Therefore, the chain guide assembly helps to achieve the purpose of lightweight.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A chain guide assembly, configured to be mounted on a linkage assembly of a bicycle derailleur, comprising:
    an inner plate;
    an outer plate, spaced apart from the inner plate;
    a first connecting bridge, wherein two opposite sides of the first connecting bridge are respectively connected to the inner plate and the outer plate; and
    a second connecting bridge, wherein two opposite sides of the second connecting bridge are respectively connected to the inner plate and the outer plate;
    wherein the inner plate, the outer plate, the first connecting bridge, and the second connecting bridge are made of a single piece;
    wherein the chain guide assembly further comprises at least one first structural reinforcement sheet, the at least one first structural reinforcement sheet is disposed on the inner plate, and the at least one first structural reinforcement sheet is made of metal;
    wherein the at least one first structural reinforcement sheet comprises a main body portion, a first corner portion, and a second corner portion, and the main body portion is located between and connected to the first corner portion and the second corner portion;
    wherein each of the first corner portion and the second corner portion has a convex curved surface facing outward and not facing the inner plate;
    wherein the first corner portion and the second corner portion are bent from the main body portion towards the same direction so as to form the at least one first structural reinforcement sheet as a U-shaped sheet.

2. The chain guide assembly according to claim 1, wherein the inner plate, the outer plate, the first connecting bridge, and the second connecting bridge are made of non-metallic materials.

3. The chain guide assembly according to claim 2, wherein materials of the inner plate, the outer plate, the first connecting bridge, and the second connecting bridge all comprise carbon fiber compound or glass fiber compound.

4. The chain guide assembly according to claim 1, wherein the at least one first structural reinforcement sheet has a thickness ranging between 0.1 millimeters and 3 millimeters.

5. The chain guide assembly according to claim 1, further comprising a structural reinforcement protrusion, wherein the structural reinforcement protrusion is disposed on a surface of the outer plate facing the inner plate, and the structural reinforcement protrusion and the outer plate are made of a single piece and made of a same material.

6. The chain guide assembly according to claim 1, further comprising a second structural reinforcement sheet, wherein the at least one first structural reinforcement sheet is disposed on a surface of the inner plate facing the outer plate, the second structural reinforcement sheet is disposed on a surface of the outer plate facing the inner plate, and the second structural reinforcement sheet is made of metal.

7. The chain guide assembly according to claim 6, wherein an area of the at least one first structural reinforcement sheet is larger than an area of the second structural reinforcement sheet.

8. The chain guide assembly according to claim 6, wherein the at least one first structural reinforcement sheet and the second structural reinforcement sheet are respectively disposed on the inner plate and the outer plate via adhesive.

9. The chain guide assembly according to claim 6, wherein the at least one first structural reinforcement sheet and the second structural reinforcement sheet are respectively embedded to the inner plate and the outer plate.

10. The chain guide assembly according to claim 6, wherein the at least one first structural reinforcement sheet and the second structural reinforcement sheet have thicknesses ranging between 0.1 millimeters and 3 millimeters.

11. The chain guide assembly according to claim 1, wherein the first corner portion and the second corner portion each have a curvature not less than 0.1 millimeters.

12. The chain guide assembly according to claim 1, further comprising a third connecting bridge, two opposite sides of the third connecting bridge are respectively connected to the outer plate and the inner plate, the first connecting bridge is located between the second connecting bridge and the third connecting bridge, and the inner plate, the outer plate, the first connecting bridge, the second connecting bridge, and the third connecting bridge are made of a single piece.

13. The chain guide assembly according to claim 1, further comprising a first structural reinforcement protrusion and a second structural reinforcement protrusion, wherein the first structural reinforcement protrusion is disposed on a surface of the inner plate facing the outer plate, the first structural reinforcement protrusion and the inner plate are made of a single piece and made of a same material, the second structural reinforcement protrusion is disposed on a surface of the outer plate facing the inner plate, and the second structural reinforcement protrusion and the outer plate are made of a single piece and made of a same material.

14. A structural reinforcement sheet, configured to be disposed on a chain guide assembly, comprising:
    a main body portion;
    a first corner portion; and
    a second corner portion, wherein the main body portion is located between and connected to the first corner portion and the second corner portion;
    wherein each of the first corner portion and the second corner portion has a convex curved surface facing outward and not facing an inner plate of the chain guide assembly;
    wherein the first corner portion and the second corner portion are bent from the main body portion towards the same direction so as to form the structural reinforcement sheet as a U-shaped sheet.

15. The structural reinforcement sheet according to claim 14, wherein the first corner portion and the second corner portion each have a curvature not less than 0.1 millimeters.

16. A chain guide assembly, configured to be mounted on a linkage assembly of a bicycle derailleur, comprising:
    an inner plate;
    an outer plate, spaced apart from the inner plate;
    a first connecting bridge, wherein two opposite sides of the first connecting bridge are respectively connected to the inner plate and the outer plate, and the first connecting bridge has a pivot part; and
    a second connecting bridge, wherein two opposite sides of the second connecting bridge are respectively connected to the inner plate and the outer plate;
    wherein the inner plate, the outer plate, the first connecting bridge, and the second connecting bridge are made of a single piece;
    wherein the first connecting bridge has only one pivot part having only one pivot hole.

17. The chain guide assembly according to claim 16, wherein the inner plate, the outer plate, the first connecting bridge, and the second connecting bridge are made of non-metallic materials.

18. The chain guide assembly according to claim 17, wherein materials of the inner plate, the outer plate, the first connecting bridge, and the second connecting bridge all comprise carbon fiber compound or glass fiber compound.

19. The chain guide assembly according to claim 17, further comprising at least one first structural reinforcement sheet, wherein the at least one first structural reinforcement sheet is disposed on the inner plate, and the at least one first structural reinforcement sheet is made of metal.

20. The chain guide assembly according to claim 19, wherein the at least one first structural reinforcement sheet has a thickness ranging between 0.1 millimeters and 3 millimeters.

21. The chain guide assembly according to claim 19, further comprising a structural reinforcement protrusion, wherein the structural reinforcement protrusion is disposed on a surface of the outer plate facing the inner plate, and the structural reinforcement protrusion and the outer plate are made of a single piece and made of a same material.

22. The chain guide assembly according to claim 19, wherein the at least one first structural reinforcement sheet comprises a plate portion, a first corner portion, and a second corner portion, and the plate portion are located between and connected to the first corner portion and the second corner portion.

23. The chain guide assembly according to claim 22, wherein the first corner portion and the second corner portion each have a curvature not less than 0.1 millimeters.

24. The chain guide assembly according to claim 16, further comprising a third connecting bridge, two opposite sides of the third connecting bridge are respectively connected to the outer plate and the inner plate, the first connecting bridge is located between the second connecting bridge and the third connecting bridge, and the inner plate, the outer plate, the first connecting bridge, the second connecting bridge, and the third connecting bridge are made of a single piece.

25. The chain guide assembly according to claim 16, further comprising a first structural reinforcement protrusion and a second structural reinforcement protrusion, wherein the first structural reinforcement protrusion is disposed on a surface of the inner plate facing the outer plate, the first structural reinforcement protrusion and the inner plate are made of a single piece and made of a same material, the second structural reinforcement protrusion is disposed on a surface of the outer plate facing the inner plate, and the second structural reinforcement protrusion and the outer plate are made of a single piece and made of a same material.

26. A chain guide assembly, configured to be mounted on a linkage assembly of a bicycle derailleur, comprising:
   an inner plate;
   an outer plate, spaced apart from the inner plate;
   a first connecting bridge, wherein two opposite sides of the first connecting bridge are respectively connected to the inner plate and the outer plate; and
   a second connecting bridge, wherein two opposite sides of the second connecting bridge are respectively connected to the inner plate and the outer plate;
   wherein the inner plate, the outer plate, the first connecting bridge and the second connecting bridge are made of carbon fiber compound material, and the inner plate, the outer plate, the first connecting bridge and the second connecting bridge together form an opening by an integral connection thereamong.

27. A chain guide assembly, configured to be mounted on a linkage assembly of a bicycle derailleur, comprising:
   an inner plate;
   an outer plate, spaced apart from the inner plate;
   a first connecting bridge, wherein two opposite sides of the first connecting bridge are respectively connected to the inner plate and the outer plate; and
   a second connecting bridge, wherein two opposite sides of the second connecting bridge are respectively connected to the inner plate and the outer plate;
   wherein the inner plate, the outer plate, the first connecting bridge and the second connecting bridge are made of carbon fiber compound material, and the inner plate, the outer plate, the first connecting bridge and the second connecting bridge together form an opening by a non-riveting, non-screwing or non-snap-fit manner.

28. A chain guide assembly, configured to be mounted on a linkage assembly of a bicycle derailleur, comprising:
   an inner plate;
   an outer plate, spaced apart from the inner plate;
   a first connecting bridge, wherein two opposite sides of the first connecting bridge are respectively connected to the inner plate and the outer plate; and
   a second connecting bridge, wherein two opposite sides of the second connecting bridge are respectively connected to the inner plate and the outer plate;
   wherein the inner plate, the outer plate, the first connecting bridge and the second connecting bridge are made of carbon fiber compound material, and the inner plate, the outer plate, the first connecting bridge and the second connecting bridge together form an opening by an integral connection thereamong and a non-riveting, non-screwing or non-snap-fit manner.

* * * * *